United States Patent
Wygant

(10) Patent No.: US 7,191,353 B2
(45) Date of Patent: Mar. 13, 2007

(54) COORDINATION OF MULTIPLE MULTI-SPEED DEVICES

(75) Inventor: Laurance F. Wygant, DuPont, WA (US)

(73) Assignee: Intel Corporation, Santa Clara, CA (US)

( * ) Notice: Subject to any disclaimer, the term of this patent is extended or adjusted under 35 U.S.C. 154(b) by 446 days.

(21) Appl. No.: 10/404,291

(22) Filed: Mar. 31, 2003

(65) Prior Publication Data

US 2004/0024923 A1 Feb. 5, 2004

Related U.S. Application Data

(60) Provisional application No. 60/388,922, filed on Jun. 14, 2002.

(51) Int. Cl.
*G06F 13/14* (2006.01)
(52) U.S. Cl. ............... 713/400; 713/401; 713/500; 713/501; 713/502; 713/503
(58) Field of Classification Search ........ 713/400–401, 713/500–503
See application file for complete search history.

(56) References Cited

U.S. PATENT DOCUMENTS

| | | | | | |
|---|---|---|---|---|---|
| 4,350,979 | A | * | 9/1982 | Eberwein | 340/853.1 |
| 5,802,355 | A | * | 9/1998 | Arroyo et al. | 713/375 |
| 5,875,320 | A | * | 2/1999 | Gu | 713/375 |
| 5,964,846 | A | * | 10/1999 | Berry et al. | 713/375 |
| 6,301,655 | B1 | * | 10/2001 | Manohar et al. | 712/244 |
| 6,711,693 | B1 | * | 3/2004 | Golden et al. | 713/400 |
| 6,801,951 | B1 | * | 10/2004 | Roden, III | 709/248 |
| 6,804,790 | B2 | * | 10/2004 | Rhee et al. | 713/320 |
| 6,832,326 | B2 | * | 12/2004 | Kubo et al. | 713/400 |
| 2004/0098631 | A1 | * | 5/2004 | Terrell, II | 713/322 |

* cited by examiner

*Primary Examiner*—A. Elamin
(74) *Attorney, Agent, or Firm*—Sanjay S. Gadkari

(57) ABSTRACT

A master device communicating a first range of speeds at which the master device is operable, to a first slave device, the master device and the first slave device determining a second range of speeds most closely matched to the first range of speeds at which each of the master device and the first slave device is respectively operable; and the master device setting the operating range of speeds of each of the master device and the first slave device to the second target range of speeds.

22 Claims, 3 Drawing Sheets

Fig. 2     BSP: Simplified Flowchart

COORDINATION OF MULTIPLE MULTI-SPEED DEVICES

CROSS REFERENCE TO RELATED APPLICATIONS

This non-provisional United States (U.S.) patent application claims the benefit of U.S. Provisional Application No. 60/388,922 filed on Jun. 14, 2002 by inventor Laurance F. Wygant entitled "Coordination of Multiple Multi-speed Devices."

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In a multiprocessor computer system where coordination among processors occurs during system start, the processors need to have well defined protocols that operate at startup.

In one embodiment of such a system, a predetermined setting such as a jumper configuration selects one of the several processors in a multiprocessor system to initiate startup. This processor is designated as the bootstrap processor (BSP). The BSP is then responsible for starting up the other processors, known as application processors or APs. There may not be any inherent difference between the BSP and APs, though it is necessary that each processor be able to determine whether it is the BSP or an AP once a BSP has been selected. In such systems, startup protocols then need to be executed by the APs and the BSP in order for startup to be completed successfully.

Specifically, on system startup, the BSP needs to execute a protocol to discover the other processors in the system and determine if they are functional. If two or more processors of the system are each capable of operating over a range of speeds, or more specifically, frequencies, they may then need to be synchronized at a common frequency in order for the system to operate correctly. This synchronization problem is exacerbated when each processor, in turn, is operable in multiple frequency modes. A processor may be so designed in order to operate in a lower frequency mode in order to conserve power or to reduce heat dissipation, and switch to a higher frequency mode to increase computing power or when heat dissipation is not a significant constraint. In these situations each of the multiple frequency modes at which a processor may operate may itself have a range of frequencies at which the processor is operable when in that mode. For example, a processor may operate at any frequency between 667 MHz and 733 MHz in a low power mode and at any frequency between 1.33 GHz and 1.67 GHz in a high power mode. Therefore, a frequency common to all processors in each of these modes may also need to be determined.

Furthermore, any mechanism to determine a common frequency may in some instances fail, such as for example when a new processor is installed in a multiprocessor system that is in fact not compatible with one or more of the existing installed processors in terms of their frequency ranges. A system that synchronizes processor frequencies should be reliable in that it should in such a case be able to gracefully fall back to a smaller number of processors for startup or to abort a startup that cannot complete because of incompatibilities in frequency ranges that cannot be feasibly resolved within the set of processors in the system.

In order for two concurrently executing threads, potentially in two different processors, to execute a protocol to synchronize internal parameters such as clock frequencies, the two threads need a communication and coordination mechanism. In a shared memory implementation of such a mechanism, a read/write memory area may be used to store coordination variables such as semaphores that allow the processors to signal each other when specific events occur, as well as to store any data that is actually communicated between the two threads.

DETAILED DESCRIPTION

Multiprocessor Computer System

Figure 1:
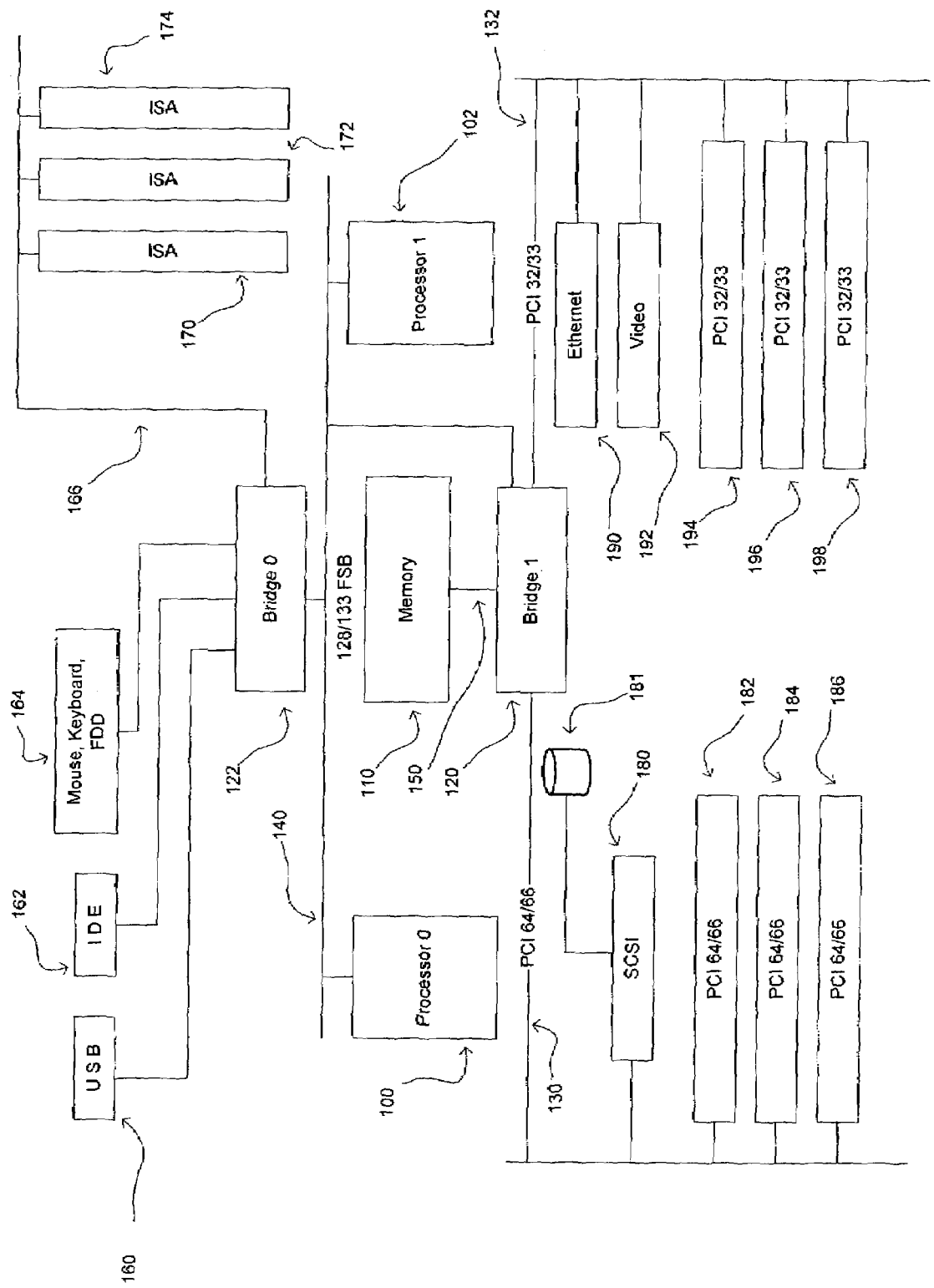
FIG. 1 is a high-level block diagram of a multiprocessor computer system according to an embodiment of the present invention.

FIG. 1 shows a high-level block diagram of a multiprocessor computer system including an embodiment of the claimed subject matter. This system may in general include several processors, for example the processors 100 and 102 in the figure. One of the processors in this embodiment is designated the bootstrap processor (BSP) at startup by some deterministic protocol, and the other processors are termed application processors (APs). The processors are socketed into a system board. Using board logic and interconnect, the processors are able to access a shared memory subsystem 110 by means of a bus such as a front side bus (FSB) 140, and a memory controller which is part of the integrated device 120. In some embodiments, processors may also be interconnected to shared register sets which may be general purpose or special purpose register sets accessible from two or more of the processors. In some embodiments, there may be more than two processors and the bus configuration connecting them to memory and other parts of the system may differ; moreover, the processors may not be part of a general purpose computer system as depicted in FIG. 1, but rather part of any device that uses digital processing capabilities, including digital communication devices such as telephones, or network routing devices; hand held devices such as Personal Digital Assistants (PDAs) and dedicated subsystems included in other digital devices such as a digital television set top box or digital display devices, a digital game console, or a web terminal, among others.

The memory subsystem of the computer system 110 in an embodiment of the claimed subject matter may be one of several types, including for example, a Dynamic Random Access Memory (DRAM) memory subsystem such as Rambus Direct DRAM (RDRAM) or Double-Data-Rate DRAM (DDR RAM), or Synchronous DRAM (SDRAM), depending on the specific characteristics of the memory controller 110 and other board logic.

Typically, the processors are also connected to one or more local buses via a bridge. In the embodiment shown in the figure, the integrated device 120 combines the functionality of the memory controller and a bridge that connects the front side bus to a pair of local buses, for example, buses 130 and 132, each of which conforms to the Peripheral Component Interconnect (PCI) Local Bus Specification version 2.3 or the "PCI Specification." Such a bus is termed a "PCI bus." In this embodiment, the bridge provides logic and various control functions that allow the processors to address, configure, and exchange data with devices on the bus and the controller itself. In this embodiment, one of the PCI buses, 130, is a 64-bit bus that operates at 66 MHz and the other, 132, a 32-bit bus that operates at 33 MHz. The FSB also connects via a second bridge 122 to a lower speed Industry Standard Architecture (ISA) bus 166, to a Universal Serial Bus (USB) 160, an Integrated Drive Electronics (IDE) bus 162, and low-speed input/output devices such as a Mouse, Keyboard and Floppy Disk Drive 164.

These low-speed devices are specific to the general purpose computer embodiment that is depicted in FIG. 1 and may differ in other embodiments, or be entirely absent, for example, in a game console or a cellular telephone embodiment.

System Startup

Figure 2:
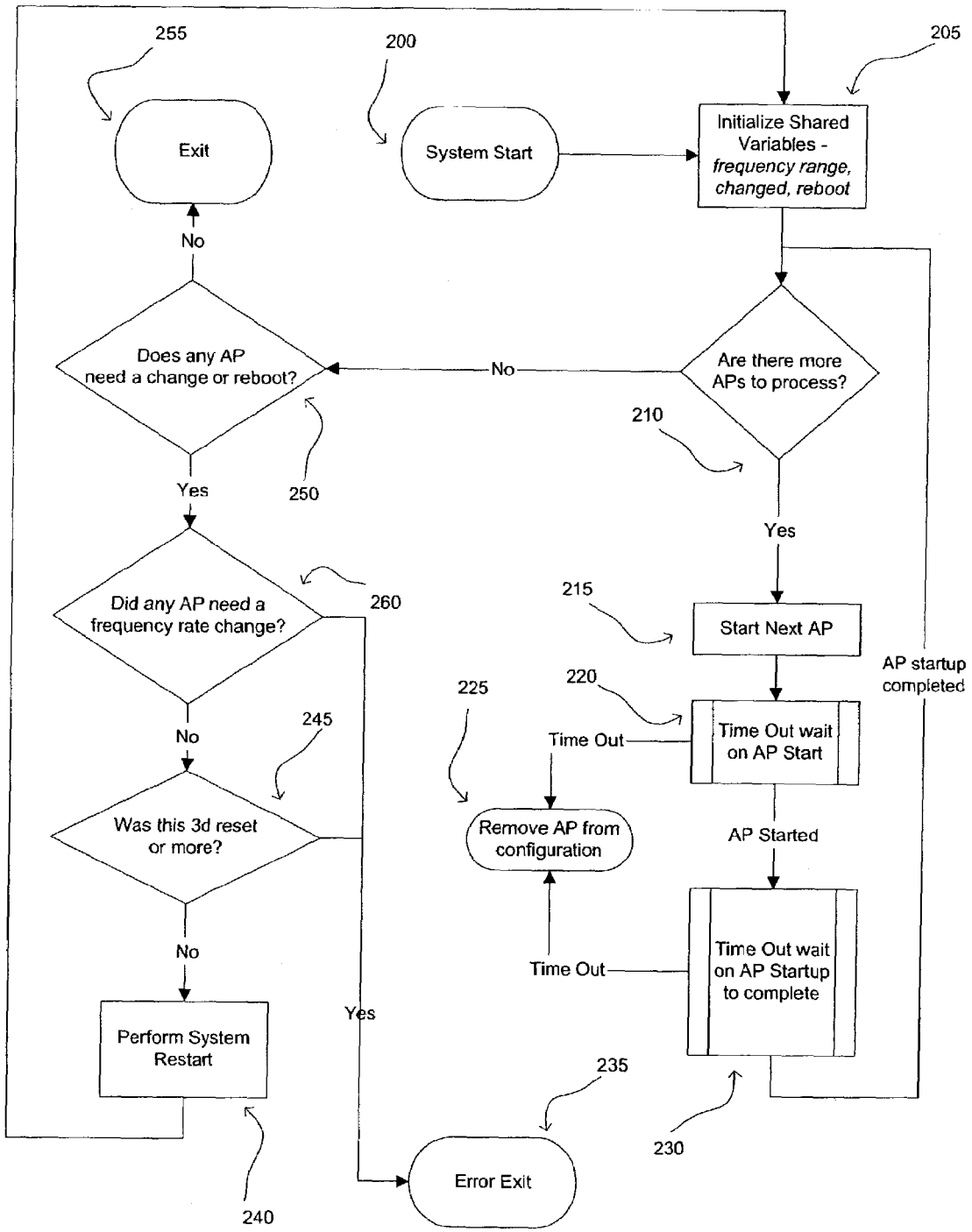
FIG. 2 is a simplified flowchart of a thread executing on a bootstrap processor according to an embodiment of the present invention.
Figure 3:
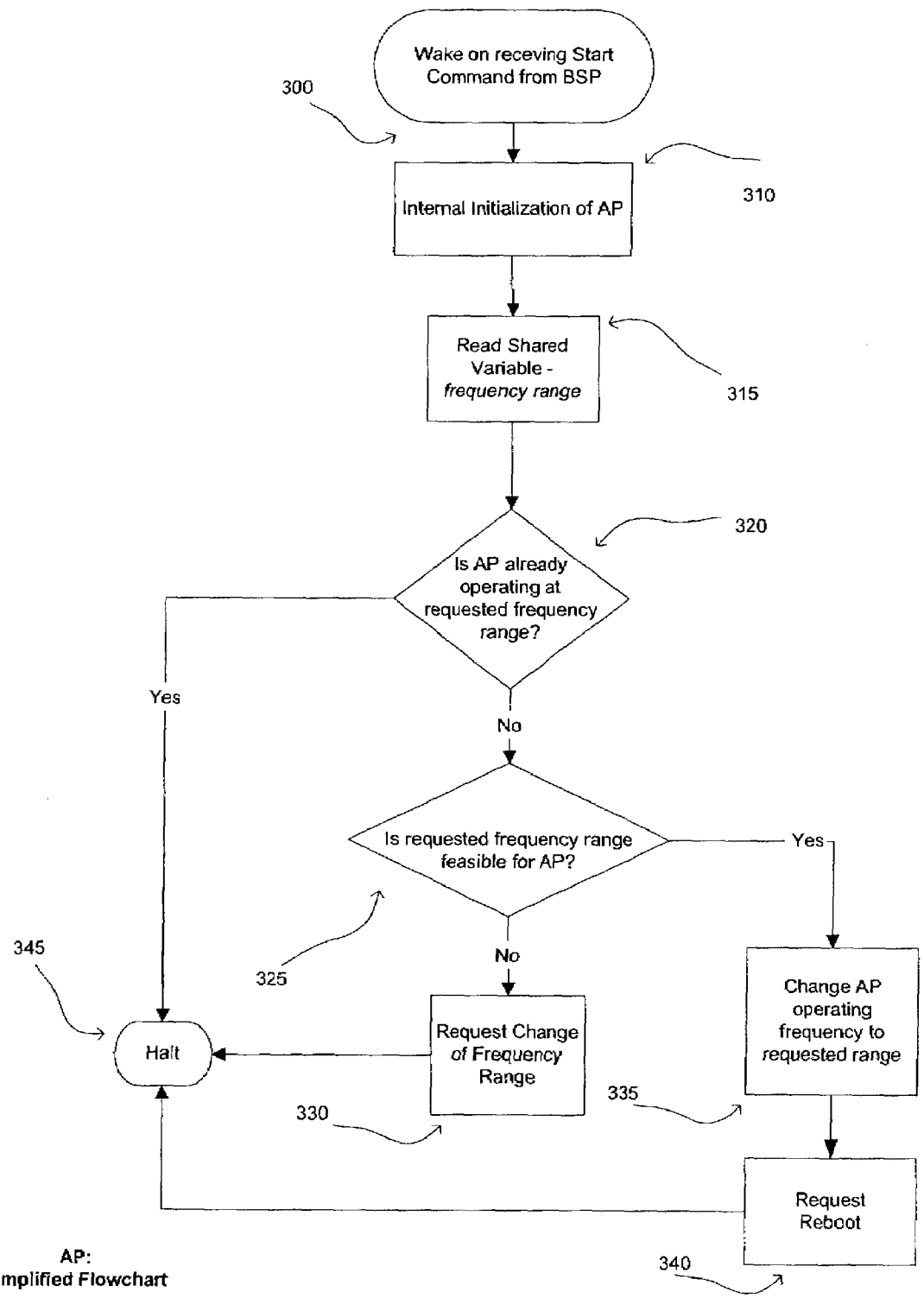
FIG. 3 is a simplified flowchart of a thread executing on an application processor according to an embodiment of the present invention.

FIGS. 2 and 3 represent in a flowchart form the process of processor startup in a multiprocessor system in one embodiment of the claimed subject matter. In this embodiment, each processor operates at one of a pair of speeds, or more specifically, frequencies. The invention is not limited to pairs of speeds, rather it may also apply to continuous or discrete ranges of speeds or frequencies. For example, in some embodiments some processors in the system may be operable at one of three or more frequencies. In other embodiments, each or some processors may be able to continuously vary their operating frequencies over a range.

The outcome of a completed execution of the threads in the start-up process is the synchronization of the frequency ranges at which the BSP and the AP respectively operate. Various error conditions are checked and exits occur when they are detected. The two threads BSP and ASP execute on the BSP and AP respectively.

FIG. 2 shows the execution of the thread on the BSP, and FIG. 3, the corresponding thread on an AP. In FIG. 2, the BSP repeatedly performs a computation depicted by the blocks 215–230, controlled by the looping condition 210—that is, the operations are performed as long as there are more APs to process. For each AP, the BSP communicates with it using shared variables 205. The first step of the process is to initialize these shared variables indicating the desired frequency range to the AP, 205. After the AP is started, 215, the BSP waits to confirm that startup was successful, and if a timeout 220 or 230 occurs, exits to an handler 225 that removes the AP from the current set of processors that is to participate in startup, the current configuration. Once all the APs have started successfully, the BSP reads the shared variables and determines whether the AP needs a change of frequency range or a reboot, 250, from the values of the shared variables 205 written by the AP. If the AP and BSP cannot find a mutually compatible range, as in tests 260 and 245, an error handler 235 is called. If the AP needs an adjustment to the frequency range or a reboot, the BSP modifies the shared variables accordingly, and restarts the system as shown at block 240.

FIG. 3 shows the corresponding execution of an AP that is in communication with the BSP during startup. On receiving a start command 300, the AP completes any internal initialization necessary for startup, 310, and then reads the shared variable storage initialized previously by the BSP, 315. If the AP is not already operating at the requested frequency range (test 320) and cannot adjust its frequency range to the requested range, (test 325), it requests the BSP for a new range and writes the desired range to the shared variables in step 330. The AP then halts, 345, and awaits a restart. If the AP is capable of adjusting its frequency to the desired range, it checks whether it needs a reboot to change its frequency range, 335, and if so, requests a reboot by setting the appropriate shared variable in step 340 and halting. Otherwise, the AP has reached the target frequency and processing terminates successfully.

These flowcharts are simplified for clarity. A more detailed version of the processor startup protocol is provided below in Table 1, a pseudocode algorithm that corresponds to one instantiation of the flowchart referenced above and provides additional detail. An overview of the algorithm is provided below:

The BSP thread initializes the shared variables shared_AP_started and shared_AP_done, reads the target frequency range and changes its operating range to match. It then communicates the range to the AP using shared storage. Next, it starts the AP and waits to see if the AP indicates a successful start; and then waits for a successful completion of the AP's initialization.

The AP on starting, sets its operating range to match the target range if it can—if it cannot, it communicates its desired target range back to the BSP and sets the shared_changed flag to signal it needs a change in the target. If the AP needs a reboot to switch target ranges, the AP also sets the shared_reboot flag. The AP may perform other initialization actions, and then halts.

The BSP loops through the original process if necessary until the AP and the BSP agree upon a frequency range, indicated by reboot and changed both being zeros. If the BSP and AP cannot agree after two rounds of adjustment (AP needs to change frequencies more than two times), an error handling routine is invoked.

The BSP repeats this process for multiple processors.

Some of the assumptions and notation used in the pseudocode are clarified below:

← is the assignment symbol; = denotes equality write_shared is a function that writes to memory shared by the BSP and AP.

reset is an enumerated variable with three values, initial, first, and second;

start_AP is a function that starts the AP timer( ) returns the value of a global timer that is always ticking reset_timer( ) forces the value of the global timer to zero Writing a frequency range value to input_range causes that value to be used by the processor on reboot Range comparisons are assumed to work as follows For a range of real numbers r=[1 ... h], where r is a range defined as the set $\{x: l<=x<=h\}$, l and h are real numbers, and l<=h, r1 and r2 are ranges [l1 ... h1] and [l2 ... h2] respectively, r1=r2 if and only if h=h2 and l1=l2, otherwise r1< >r2 r1<=r2 if and only if h1<=h2 and l1>=l2 r1<r2 if and only if r1<=r2 and r1< >r2

Range assignment

In a program state starting with r1=[l1 ... h1] and r2=[l2 ... h2], r2←r1 yields a new program state with r1=[l2 ... h2] and r2=[l2 ... h2].

TABLE 1

Startup Sequence Pseudocode

```
© 2003 Intel Corporation
Shared Variables
shared_AP_started, shared_AP_done, shared_reboot, shared_changed :
BOOLEAN ← FALSE
shared_target range: FREQUENY RANGE;
BSP:
Local Constants
AP_failed, AP_unresponsive, AP_setting_failed, APs_incompatible,
internal_error = /* some fixed values */
Local Variables
reset: (initial, first, second) ← initial;
reboot, changed, AP_started, AP_done : BOOLEAN ← FALSE;
system_target_range, input_range, target_range, current_range :
FREQUENY RANGE;
Begin
write_shared( shared_AP_started, FALSE ) ;
write_shared( shared_APdone, FALSE ) ;
Repeat
    current_range = input_range; /* processor operates in current
    range */
    reboot <- FALSE;
    changed <- FALSE;
    if reset = initial then
        target_range = system_target_range;
        if target_range < > current_range then
            if target_range > max_range then
                target_range ← max_range
            endif
            input_range ← target_range
            reboot ← TRUE;
        endif
    else
        target_range ← current_range
    endif
    write_shared( shared_target_range, target_range)
    write_shared( shared_reboot, reboot)
    write_shared( shared_changed, changed);
    start_AP ( )
    reset_timer ( );
    repeat
        if timer( ) > AP_response_timeout then
        ERROR_EXIT (AP_unresponsive) ;
        read_shared( AP_started, shared_AP_started);
    until (AP_started);
    reset_timer ( ) ;
    repeat
        if timer( ) > AP_failure_timeout then ERROR_EXIT
        (AP_failed);
        read_shared( shared_AP_started, AP_started ) ;
        read_shared( shared_NP_done, AP_done ) ;
    until (AP_started AND AP_done) ;
    read_shared( shared_target_range, target_range)
    read_shared( shared_reboot, reboot)
    read_shared( shared_changed, changed) ;
    if reboot OR changed then
        if reset = second then ERROR_EXIT( AP_setting_failed ) ;
        if changed then
            if reset = first then ERROR_EXIT( APs_incompatible ) ;
            if NOT reboot then ERROR_EXIT( internal_error ) ;
            /* if we get here, reboot AND changed are TRUE */
            if target_range <= max_range then
                input_range ← target_range
            else
                ERROR_EXIT( APs_incompatible )
        else /* reboot only */
            reset = next(reset)
        endif
        system_reset ( ) ;
until NOT reboot AND NOT changed.
End /*BSP*/
AP:
Local Variables
reboot, changed BOOLEAN ← FALSE;
input_range, target_range, current_range : FREQUENY RANGE;
begin /* ap_started( ) is now TRUE */
initialize_processor ( );
read_shared_mem( target_range, reboot, change );
```

TABLE 1-continued

Startup Sequence Pseudocode

```
if target_range < > current_range then
    if target_range > max_range then
        target_range ← max_range
        changed ← TRUE;
    endif
    input_range ← target_range
    reboot ← TRUE;
endif
else
    target_range ← current_range
endif
write_shared_mem( target_range, reboot, changed);
halt;
/* ap_done( ) is now TRUE */
end /*AP*/
```

In some embodiments of the invention implemented in multiprocessor systems that incorporate the PCI bus, the shared variables referenced above may be implemented using the PCI Configuration Address Port Register (PCI-CAP), defined in the PCI Specification, as a data sharing register. In these embodiments, the use of the PCI-CAP is made possible using the enable bit in the PCI-CAP as a flag to determine when the other bits of the register may be used for inter-processor communication. According to the PCI Specification, the PCI-CAP has no defined purpose when the enable bit is set to 0. It is by exploiting this situation, that one embodiment of the claimed subject matter performs a data passing method using the PCI-CAP to transfer data between the BSP and an AP by setting the enable bit to 0 and then using the remaining bits of the PCI-CAP as shared register space for shared variables required to implement the invention.

It will be apparent to one skilled in the art that the above-described process is only one example of one embodiment. Many variations on the invention are possible. For example, the devices being started and synchronized may be devices other than processors, including dedicated logic units, or electromechanical devices such as transducers, oscillators or motors. Further, the range of speeds synchronized may or may not be an electronic clock frequency range, it may instead be a mechanical frequency or other speed range. The invention, for example, can readily be applied by one skilled in the art to synchronizing a set of digitally controlled motors, each of which operates over a range of speeds, where the speeds are rotational RPMs, and where each motor unit has associated with it logic that allows communication with similar logic units in other motor units. Another embodiment that may be implemented by one skilled in the art is the synchronization of frequency ranges of variable frequency digital crossovers in audio applications across multiple channels of a multi-channel digital audio speaker system, each channel having its own separate digital crossover.

Furthermore, the association of the described process with processor startup is a specific characteristic of this embodiment. In other circumstances this invention may be provided in systems at times other than startup.

Other uses for the invention can be contemplated, as illustrated above, and therefore the invention should be construed not in terms of the described embodiments but rather only in terms of the claims to follow.

EMBODIMENTS

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

IMPLEMENTATION OF METHODS

The present invention includes various steps. The steps of the present invention may be performed by hardware components, or may be embodied in machine-executable instructions, which may be used to cause a general-purpose or special-purpose processor or logic circuits programmed with the instructions to perform the steps. Alternatively, the steps may be performed by a combination of hardware and software. The present invention may be provided as a computer program product or as part of a Basic Input/Output System (BIOS) that may include a machine-readable medium having stored thereon data which when accessed by a machine may cause the machine to perform a process according to the present invention. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:
a master device communicating a first range of speeds at which the master device is operable, to a first slave device;
the master device and the first slave device determining a second range of speeds, most closely matched to the first range of speeds, at which each of the master device and the first slave device is respectively operable; and
the master device setting the operating range of speeds of each of the master device and the first slave device to the second range of speeds.

2. The method of claim 1 further comprising:
the master device communicating the second range of speeds to a second slave device;
the master device and the second slave device determining a third range of speeds most closely matched to the second range of speeds at which each of the master device, the first slave device, and the second slave device is respectively operable; and
the master device setting the operating range of speeds of each of the master device, the first slave device and the second slave device to the third range of speeds.

3. The method of claim 1 wherein determining the second range of speeds further comprises:
computing by intersection an overlap range of speeds between a maximum range of speeds at which the first slave device is operable and the first range of speeds; and
if the overlap range of speeds is not empty and differs from the first range of speeds, the first slave device communicating the overlap range of speeds to the master device; and
the master device setting the second range of speeds to the overlap range of speeds.

4. The method of claim 3 wherein one or more of the first and second ranges of speeds, the range of operating speeds of the master device, and the range of operating speeds of each of the slave devices comprises a discrete-valued range of speeds.

5. The method of claim 4 wherein the discrete valued range of speeds comprises a two-valued range of speeds.

6. The method of claim 4 wherein the discrete valued range of speeds comprises a single speed.

7. The method of claim 2 wherein:
the master device and each of the slave devices is a processor;
the operating range of speeds, maximum range of speeds and the first and second ranges of speeds of the master device and each of the slave devices is each a range of processor clock frequencies.

8. The method of claim 5 wherein:
the master device and each of the slave devices is a processor of a multiprocessor system;
the operating range of speeds, maximum range of speeds and the first and second ranges of speeds of the master device and each of the slave devices is a range of processor clock frequencies.

9. The method of claim 1 wherein communicating the first range of speeds comprises:
the processors storing and accessing the first range of speeds using a shared storage location; and
the processors using a shared memory semaphore to coordinate access to the shared storage location.

10. An apparatus comprising:
a master device coupled in communication with a first slave device to provide a first range of speeds to the first slave device and to determine with the first slave device a second range of speeds at which each of the master and the first slave devices is operable.

11. The apparatus of claim 10 further comprising:
a second slave device coupled in communication with the master device to determine with the master device a third range of speeds at which each of the two slave devices and the master devices is operable.

12. The apparatus of claim 11 wherein:
each of the master device and the slave devices comprises a processor, and the first range of speeds, the second range of speeds and the third range of speeds each is a range of processor clock frequencies.

13. The apparatus of claim 12 further comprising:
a shared storage location to store and allow access to each of the first range of speeds, the second range of speeds and the third range of speeds; and
a shared memory semaphore to provide coordination between the processors accessing the shared storage location.

14. The apparatus of claim 13 wherein:
the shared storage location is a Peripheral Component Interconnect Configuration Address Port Register; and
the shared memory semaphore is a Peripheral Component Interconnect Configuration Address Port enable bit.

15. In a multi-processor system, a method comprising:
a bootstrap processor starting a first application processor;
the bootstrap processor communicating to the first application processor a first pair of operating frequencies, at which the bootstrap processor is operable;
the bootstrap processor and the first application processor determining a second pair of operating frequencies, most closely matched to the first pair of operating frequencies, at which both processors are operable;
the bootstrap processor starting a second application processor;
the bootstrap processor communicating to the second application processor the second pair of operating frequencies;
the bootstrap processor and the second application processor determining a third pair of operating frequencies, most closely matched to the second pair of operating frequencies, at which the bootstrap processor and both application processors are operable; and the bootstrap processor setting each processor in the system to operate at the third pair of operating frequencies.

16. The method of claim 15 further comprising:
the processors communicating data via a bus addressing register on a bus coupled to the bootstrap processor and the application processors, when the bus is disabled, and using a bus enable bit as a semaphore.

17. A tangible machine-readable medium comprising data which when accessed by a machine cause the machine to perform the method of claim 1.

18. The tangible machine readable medium of claim 17 comprising further data which when accessed by the machine cause the machine to perform the method of claim 2.

19. The tangible machine readable medium of claim 17 comprising further data which when accessed by the machine cause the machine to perform the method of claim 8.

20. The tangible machine readable medium of claim 19 comprising further data which when accessed by the machine cause the machine to perform the method of claim 9.

21. A Basic Input/Output System (BIOS) of a computer system comprising data which when accessed by one or more processors causes the processors to perform the method of claim 8.

22. The BIOS of claim 21 comprising further data which when accessed by one or more processors causes the processors to perform the method of claim 9.

* * * * *